United States Patent
Henry (10) Patent No.: US 9,409,501 B2
(45) Date of Patent: Aug. 9, 2016

(54) EXERCISER FOR CAR

(71) Applicant: Will Henry, Brooklyn, NY (US)

(72) Inventor: Will Henry, Brooklyn, NY (US)

( * ) Notice: Subject to any disclaimer, the term of this patent is extended or adjusted under 35 U.S.C. 154(b) by 0 days.

(21) Appl. No.: 14/628,229

(22) Filed: Feb. 21, 2015

(65) Prior Publication Data

US 2015/0238800 A1 Aug. 27, 2015

Related U.S. Application Data

(60) Provisional application No. 61/943,351, filed on Feb. 22, 2014.

(51) Int. Cl.
*A63B 21/02* (2006.01)
*A63B 21/045* (2006.01)
*A63B 21/05* (2006.01)
*A63B 21/04* (2006.01)
*B60N 2/44* (2006.01)
*A63B 21/055* (2006.01)
*A63B 23/035* (2006.01)
*A63B 21/00* (2006.01)

(52) U.S. Cl.
CPC .......... *B60N 2/448* (2013.01); *A63B 21/00069* (2013.01); *A63B 21/0442* (2013.01); *A63B 21/0552* (2013.01); *A63B 21/1609* (2015.10); *A63B 21/4035* (2015.10); *A63B 23/03541* (2013.01); *A63B 21/00061* (2013.01); *A63B 2210/50* (2013.01); *B60N 2002/4405* (2013.01)

(58) Field of Classification Search
CPC .......... A63B 21/00058; A63B 21/00061; A63B 21/00069; A63B 21/00072; A63B 21/00043; A63B 21/0552; A63B 21/151; A63B 21/153; A63B 21/4035; A63B 21/04; A63B 21/0442; A63B 21/045; A63B 21/0455; A63B 21/055; A63B 21/0557; A63B 21/1609; A63B 23/03541; A63B 2208/0233; B60N 2/448; B60N 2/688; B60N 2002/4405; B60R 22/26; B60R 22/34; B60R 2021/022; B60R 2022/286

See application file for complete search history.

(56) References Cited

U.S. PATENT DOCUMENTS

| | | | | |
|---|---|---|---|---|
| 5,141,482 A * | 8/1992 | Hern | ................ | A63B 21/0552 482/123 |
| 5,234,394 A * | 8/1993 | Wilkinson | ........... | A63B 21/055 482/121 |
| 5,618,249 A * | 4/1997 | Marshall | .............. | A63B 21/153 482/115 |
| 5,792,034 A * | 8/1998 | Kozlovsky | ......... | A63B 21/0004 482/124 |
| 6,159,133 A * | 12/2000 | Shugg | .................. | A63B 21/023 482/121 |
| 6,183,403 B1 * | 2/2001 | Dunn | ................. | A63B 21/0552 482/121 |
| 6,500,103 B2 * | 12/2002 | Porter | ................ | A63B 21/0414 297/468 |
| 7,611,450 B2 * | 11/2009 | Mancini | ................ | A63B 21/04 482/123 |
| 8,932,191 B2 * | 1/2015 | Failer | .................. | A63B 21/008 482/112 |
| 8,939,874 B2 * | 1/2015 | Mizrachy | ........... | A63B 21/0552 482/124 |

(Continued)

*Primary Examiner* — Oren Ginsberg
*Assistant Examiner* — Joshua Lee
(74) *Attorney, Agent, or Firm* — Law Offices of Leo Mikityanskiy, P.C.; Leonid Mikityanskiy (57) ABSTRACT

A portable exerciser that fits in a car that allows the user to exercise in traffic when the vehicle is not moving, or while the car is parked. The exerciser includes a body, resistance elements attached to the body and a tension adjuster, and handles attached to the resistance elements so that the user may exercise. The resistance elements are adjustable using the tension adjuster or replaceable for selecting the proper tension for any user. The exerciser is mounted behind or in front of the car seat, which can be the driver seat or the passenger seat.

20 Claims, 11 Drawing Sheets

(56) References Cited

U.S. PATENT DOCUMENTS

| | | | | |
|---|---|---|---|---|
| 2002/0160892 A1* | 10/2002 | Rovinsky | ............... | A63B 21/04 482/148 |
| 2003/0087735 A1* | 5/2003 | Chen | ................... | A63B 21/025 482/116 |
| 2005/0143231 A1* | 6/2005 | Turnbull | ............... | A63B 21/04 482/121 |
| 2005/0159276 A1* | 7/2005 | Falcone | ................ | A63B 21/04 482/123 |
| 2006/0116251 A1* | 6/2006 | Oz | ........................ | A47C 9/002 482/91 |
| 2010/0213753 A1* | 8/2010 | Humbert | ................. | B60R 22/40 297/477 |
| 2011/0183819 A1* | 7/2011 | Pharoe | ............... | A63B 21/4025 482/105 |
| 2012/0025588 A1* | 2/2012 | Humbert | ................. | B60N 2/24 297/480 |
| 2012/0065039 A1* | 3/2012 | Alessandri | ............. | A63B 21/04 482/142 |
| 2013/0324366 A1* | 12/2013 | Pride | .................. | A63B 21/4025 482/1 |
| 2014/0371030 A1* | 12/2014 | Kivinen | ............... | A63B 23/025 482/10 |

* cited by examiner

EXERCISER FOR CAR

This invention was not made pursuant to any federally-sponsored research and/or development.

THE FIELD OF INVENTION

This invention relates to a car exerciser for exercising the upper body and upper extremities (arms) in the confined environment of a vehicle.

BACKGROUND OF THE INVENTION

Cars have become indispensible in the modern world, allowing users to drive to work, go shopping, visit family, go on vacation, move personal belongings, and to use the cars for a number of other purposes. However, with more time spend in the car, less time is left for useful and necessary activities. Most people who drive to and from work spend an inordinate amount of time in traffic jams because even the modern roads are not built to withstand the amount of traffic thrown at them. Accidents, adverse weather conditions, and other factors contribute to the huge amounts of time lost by commuters. Various valuation methods exist for estimating the value of the time lost, but in reality, the lost time is priceless because it will not be returned. Because of the long commute, fewer people have the time to go to the gym and exercise, and most people cannot go to the gym during their work day. Additionally, gym memberships can be expensive at times.

What is needed is a portable exerciser that fits in a car, which exerciser any person can take with him or her that allows the user to exercise in traffic, or even simply come out to the user's car during a lunch break to do some exercises. The benefit of exercise cannot be overestimated for healthy living, especially to those with sedentary or repetitive manual jobs. Of course, for roadway safety reasons, the portable exerciser should not be used while the user is operating a vehicle, but only when the vehicle is not moving and preferably is in the parked position.

SUMMARY OF THE INVENTION

This invention meets the current need for a portable exerciser that may be used inside a car. A portable, mobile exerciser that can be fitted inside a car and allows its user to exercise when the car is not moving is provided.

The exerciser of the present invention has a body, which is mounted in the vehicle using the mounting means, and to which resistance elements with handles are attached so that the user may exercise. The resistance elements are adjustable in tension, or they are replaceable so that the user may select the correct amount of resistance for him- or herself.

The exerciser is preferably mounted on the car seat, with the body of the exerciser preferably mounted behind the back support portion of the seat. However, the Applicant envisions an embodiment of a the exerciser that may be mounted in front of the back support portion and serve as an additional cushion or padding for the user. The exerciser may be mounted on the driver's side or on the passenger side of the car. In the case of passenger-side mounting, the user can use the exerciser when the car is parked, or a passenger can use the exerciser while the vehicle is moving, providing an added bonus to carpools.

BRIEF DESCRIPTION OF THE DRAWINGS

These features, aspects and advantages of the novel portable exerciser and method of use thereof will become further understood with reference to the following description and accompanying drawings where.

DESCRIPTION OF THE PREFERRED EMBODIMENT

The present invention is directed to a novel exerciser that may be used in a car. With reference to FIGS. 1-2 and 11-12, the novel exerciser comprises a body 10, with a front cover 12 and a cooperating rear cover 14. A tension adjuster 20 having a handle 22 is mounted on the inside of the rear cover 14, preferably approximately in the middle. The front cover 12 has a cooperating aperture 15 positioned over the tension adjuster 20 when the front cover 12 is closed, which allows the user to reach the handle 22 of the tension adjuster 20. At least one, but preferably at least two tension locks 25 are mounted on the inside of the front cover 12 around the aperture 15. The tension locks 25 engage the tension adjuster 20 when the front cover 12 is closed (i.e., attached to the rear cover 14).

Figure 8:
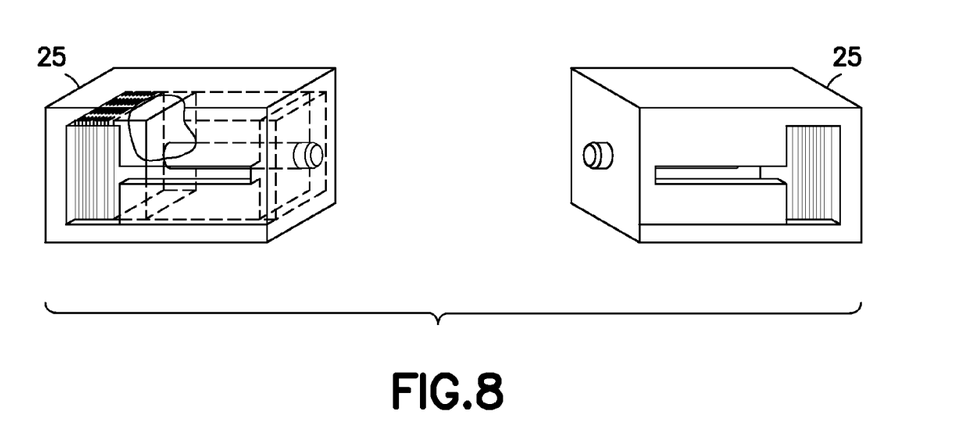
FIG. 8 is the top view of the tension adjustment locks of the exerciser of the present invention.
Figure 9:
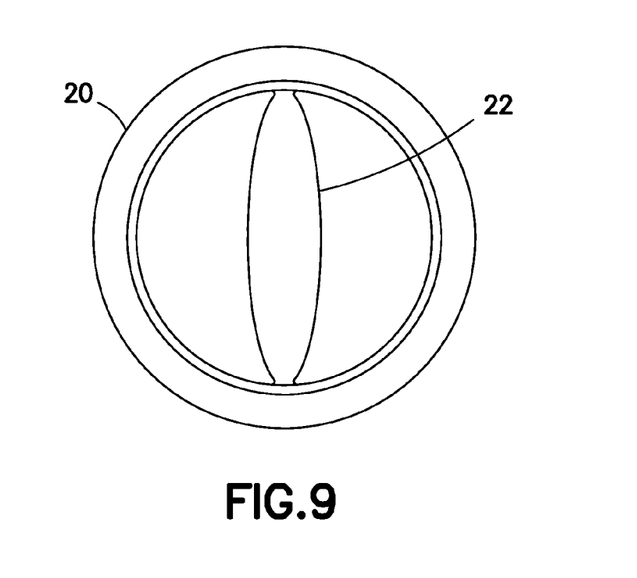
FIG. 9 is a front view of the resistance band adjuster.
Figure 10:
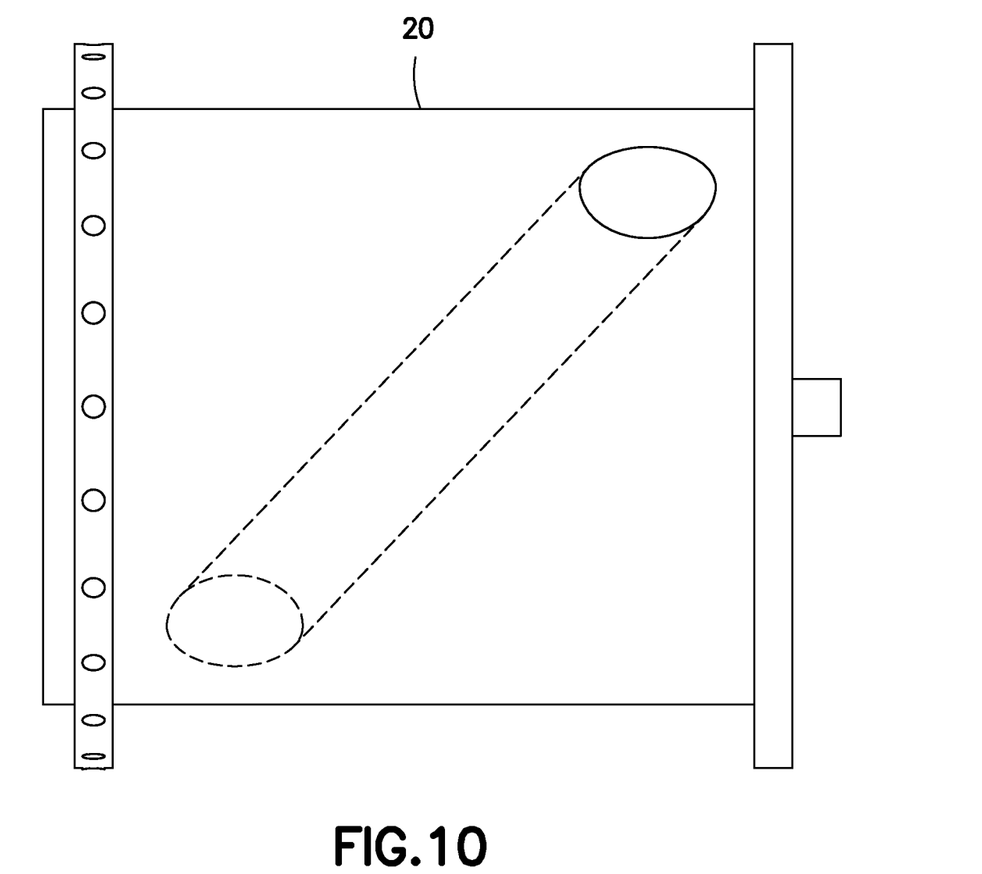
FIG. 10 is a side view of the resistance band adjuster of FIG. 9.

As illustrated in FIGS. 1-3 and 5-6, there are two tension locks 25 on either side of the tension adjuster 20. The tension locks 25 are preferably slide locks as further illustrated in FIG. 8. Once the user adjusts the tension of the resistance bands 30 to the desired level by rotating the tension adjuster 20 by its handle 22, the user slides the locks 25 into the "locked" position, one at a time. Spring loaded locks or latches 25 may be used in an alternative embodiment that will lock automatically as the user turns the tensions adjuster 20 to achieve the desired tension level of the resistance bands 30. In either embodiment, the tension locks 25 will keep the tension adjuster 20 in place after it is rotated to the desired position.

To release the tension adjuster 20 and the resistance bands 30 in the embodiment with slide tension locks 25, the user may slide the locks into the "unlocked" position while holding the tension adjuster 20 by the handle 22 so that the tension adjuster 20 and the tension bands 30 with the attached handles 35 do not snap when the tension locks 25 are released. Similarly, to release in the embodiment using spring loaded tension locks 25, the user may slide the locks into the "unlocked" position while holding the tension adjuster 20 by the handle 22 so that the tension adjuster 20 and the tension bands 30 with the attached handles 35 do not snap, but it may be a little more difficult to manipulate two spring loaded tension locks 25 and the tension adjuster handle 22 at the same time. Numerous locking and release mechanisms known in the art may be used with the present invention to "ratchet" and release the tension adjuster 20.

At least one, but preferably two resistance bands 30 are coupled with the tension adjuster 20. The two resistance bands 30 utilized in the preferred embodiment go through the tension adjuster 20 so that the resistance bands 30 tighten when the tension adjuster 20 is turned in one direction (for example, rotated clockwise), and the resistance bands 30 loosen up when the tension adjuster 20 is turned in the other direction (consistent with the prior example, rotated counter-clockwise), resulting in corresponding increase or decrease of the resistance. The unused portion of the resistance bands 30 is wound up around the body of the tension adjuster 20, which preferably has a circular cross section, similar to a fishing reel, for that purpose. The user winds up or releases parts of the resistance bands 30 by holding and rotating the handle 22 of the tension adjuster 20 as needed: clockwise or counterclockwise.

Each of the resistance bands 30 have a handle 35 attached to the other end of each resistance band 30. The handle 35 is preferably made of plastic, but it could also be made from wood, lightweight metals, such as aluminum, or it could be a strap handle, such as nylon or other synthetic material strap. Non-slip coating or materials (not shown) may be applied to the handle 35 to prevent the user's hand or foot from slipping.

As illustrated in FIGS. 1-2 and 11-12, in the preferred embodiment, there are two resistance bands 30 that are attached to the tension adjuster 20: one for each arm. Two ends of the resistance bands 30 attached to the tension adjuster 20 are positioned at the top of the exerciser 10 so that they may be used by the arms and upper body muscles to do exercises similar in effect to bench press, and two other ends of the resistance bands 30 attached to the tension adjuster 20 are positioned at the bottom of the exerciser 10, and may be pulled through under the car seat, so that they may be used by the arms of the user to do bicep curls and other exercises. The resistive or tension elements may be rubber bands, or they may utilize different resistive elements known in the art. When the resistive or tension elements are made or rubber, they may be multi-stranded bands.

With reference to FIGS. 1-3 and 11-12, to prevent damage to the resistance bands 30, each resistance band 30 is preferably enclosed by a flexible band tube 40, through which each respective resistance band 30 can move unobstructed. The flexible band tubes 40 are secured to the inside of the rear cover 14 by snaps, clips, bands, or other means known in the art. Flexible bands and screws 42 securing the flexible band tubes 40 are illustrated in FIGS. 1-4. The resistance bands 30 are further protected against damage by flexible tube bushings 50 that are preferably inserted on each end of each flexible band tube 40 as further illustrated in FIGS. 1-4. This will prevent the resistance bands 30 from rubbing on the ends of the flexible band tubes 40, possibly becoming damaged and creating the possibility of a tear.

Figure 1:
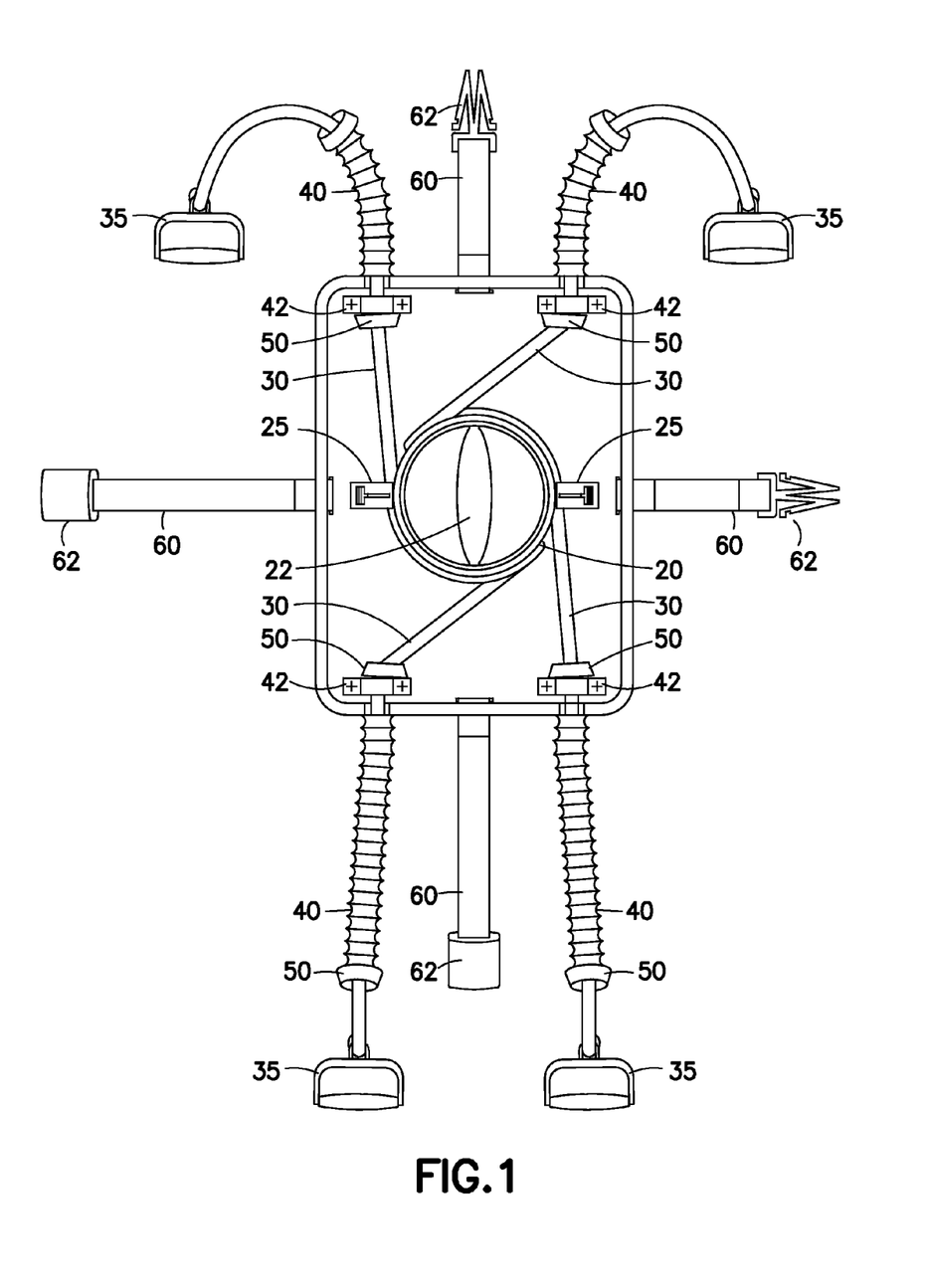
FIG. 1 is a front view of the exerciser of the present invention with the front cover open.
Figure 2:
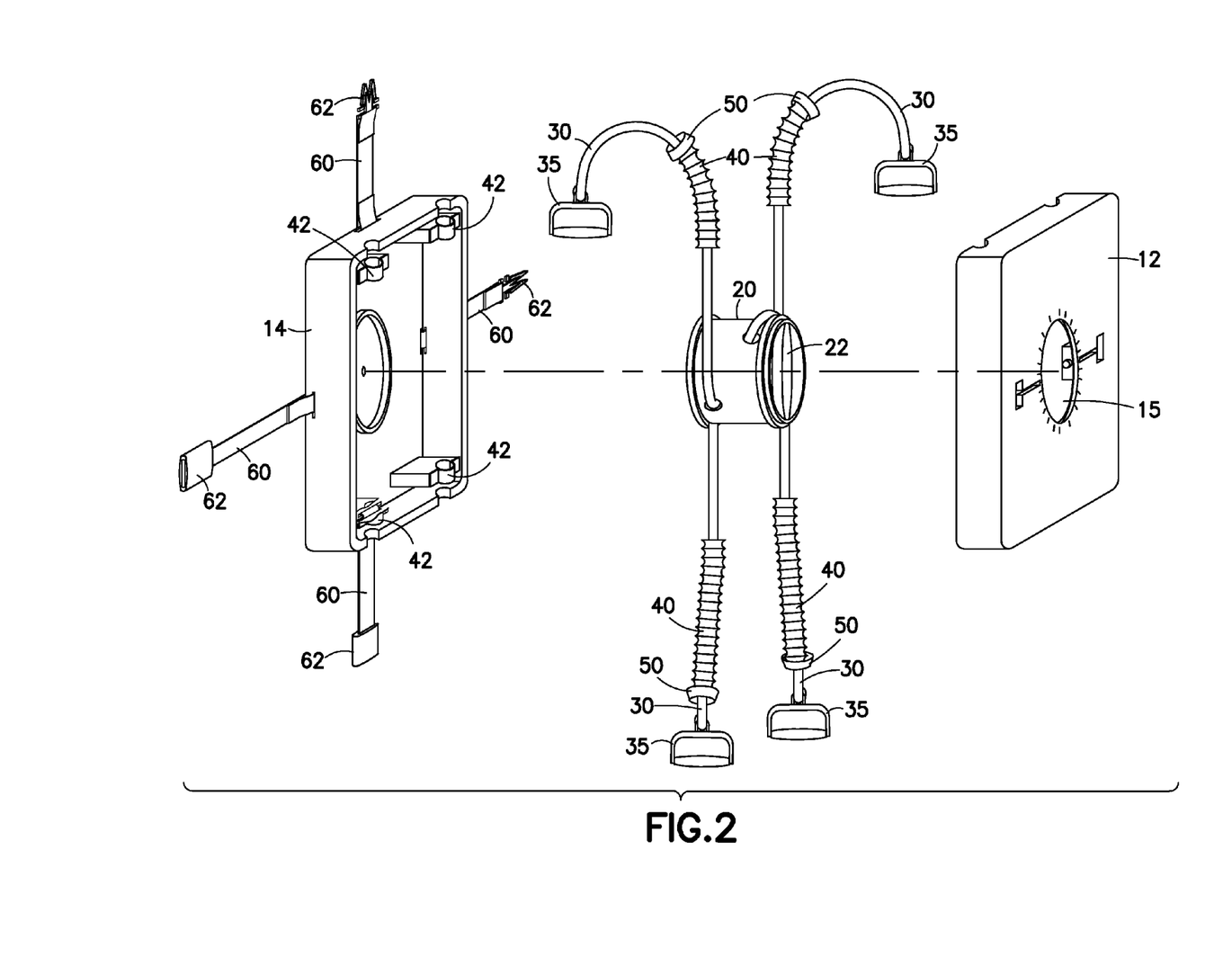
FIG. 2 is the exploded view of the exerciser of the present invention.
Figure 3:
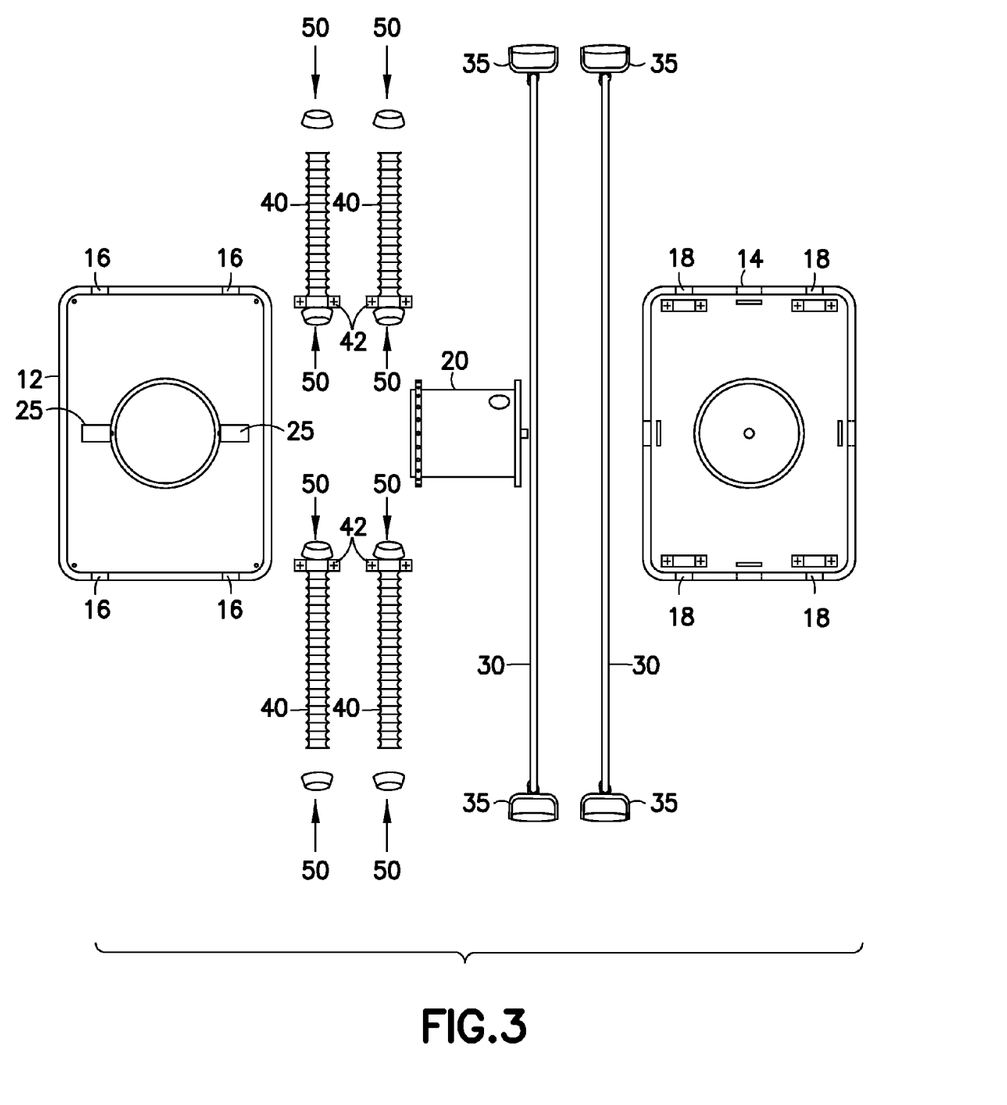
FIG. 3 is another exploded view of the exerciser of the present invention.
Figure 4:
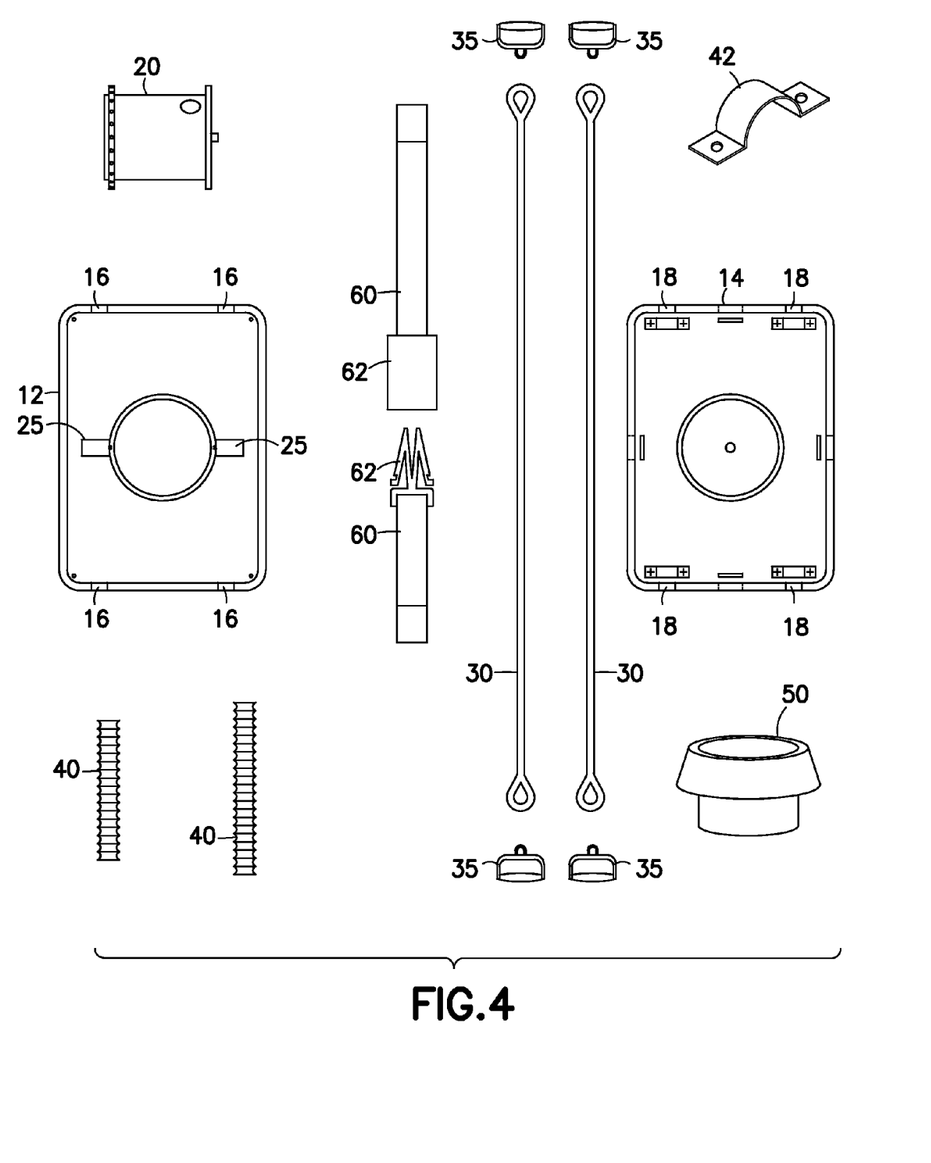
FIG. 4 is the view of the individual parts of the exerciser of the present invention.
Figure 5:
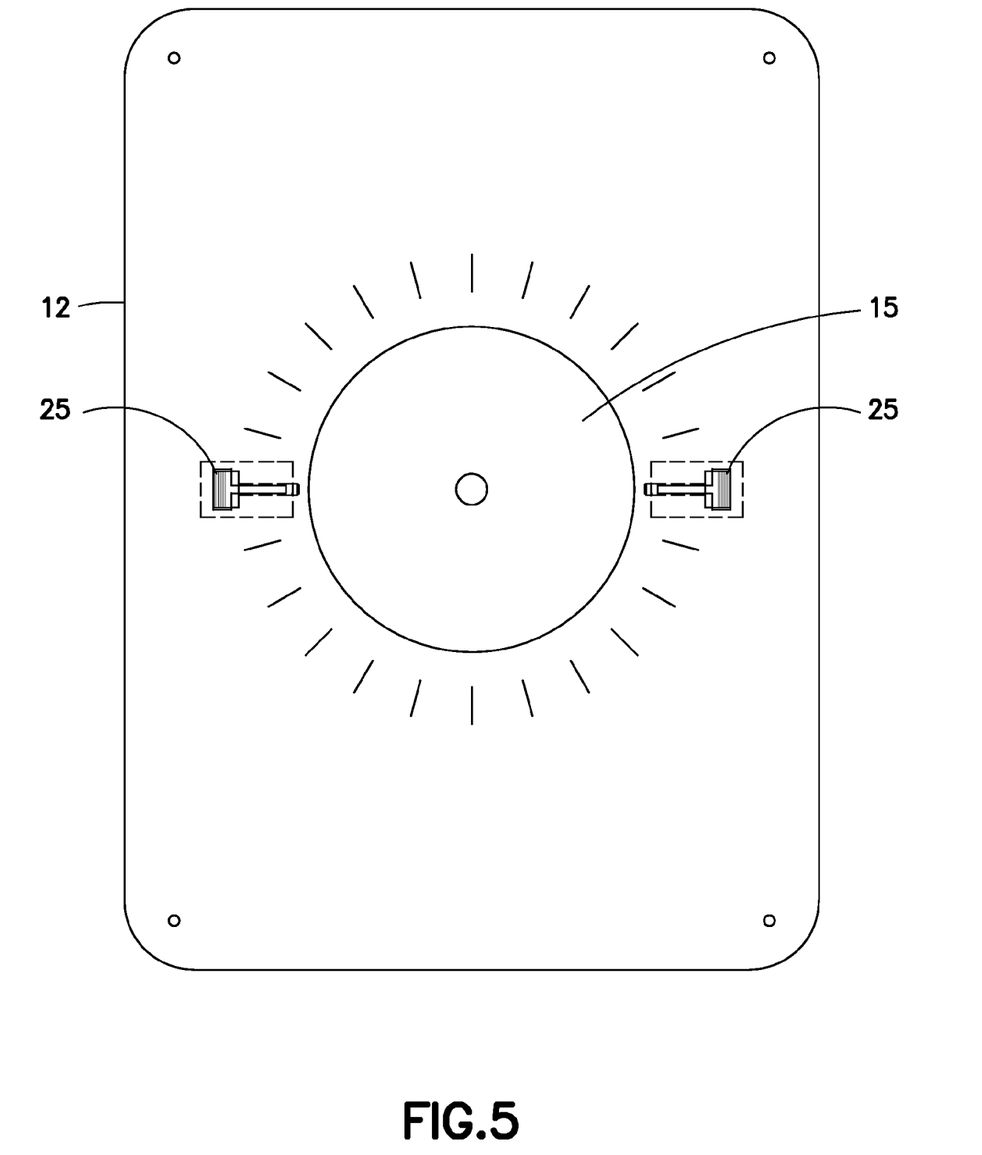
FIG. 5 is a front view of the front cover of the exerciser of the present invention.
Figure 6:
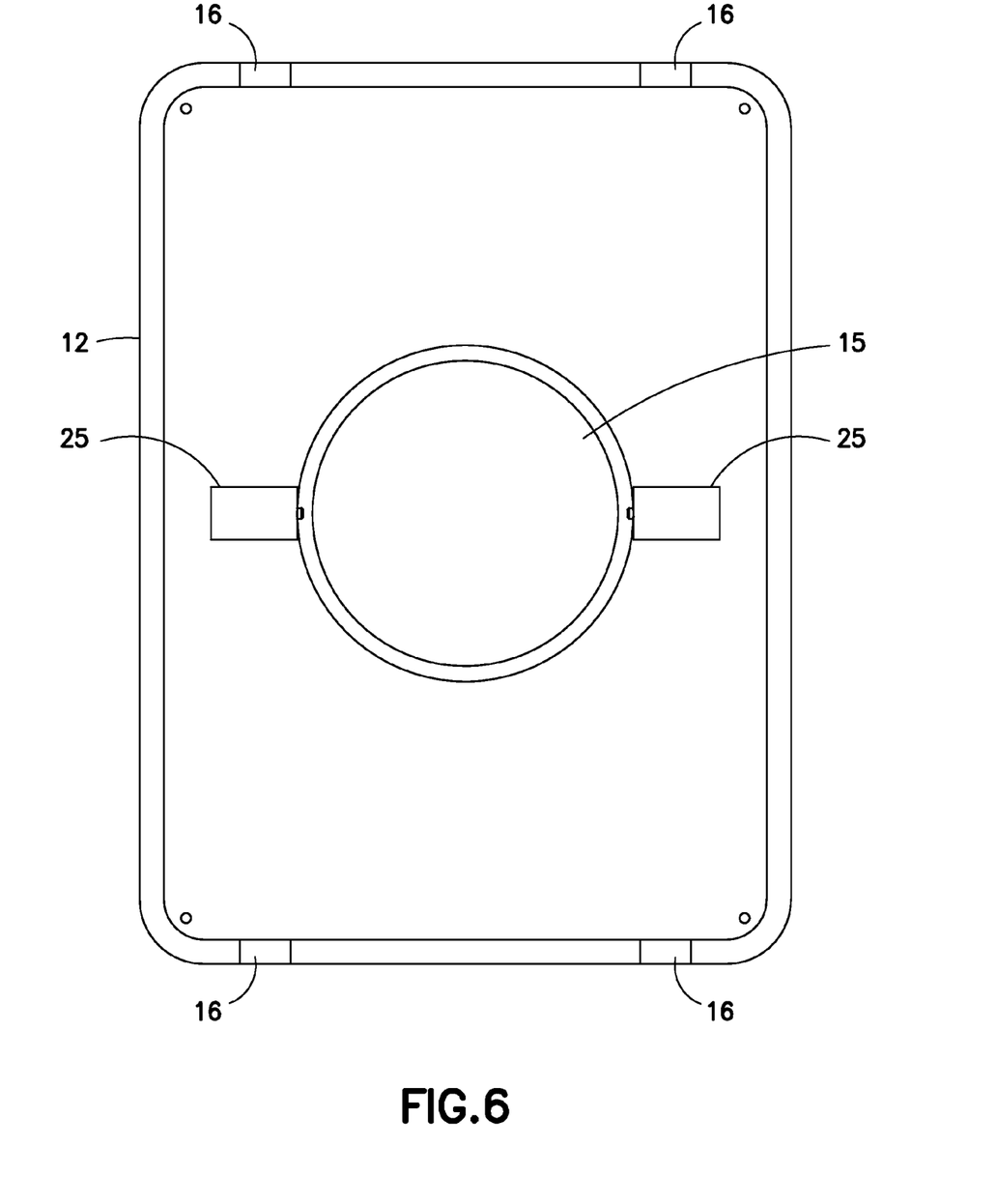
FIG. 6 is a rear (inside) view of the front cover of the exerciser of the present invention.
Figure 7:
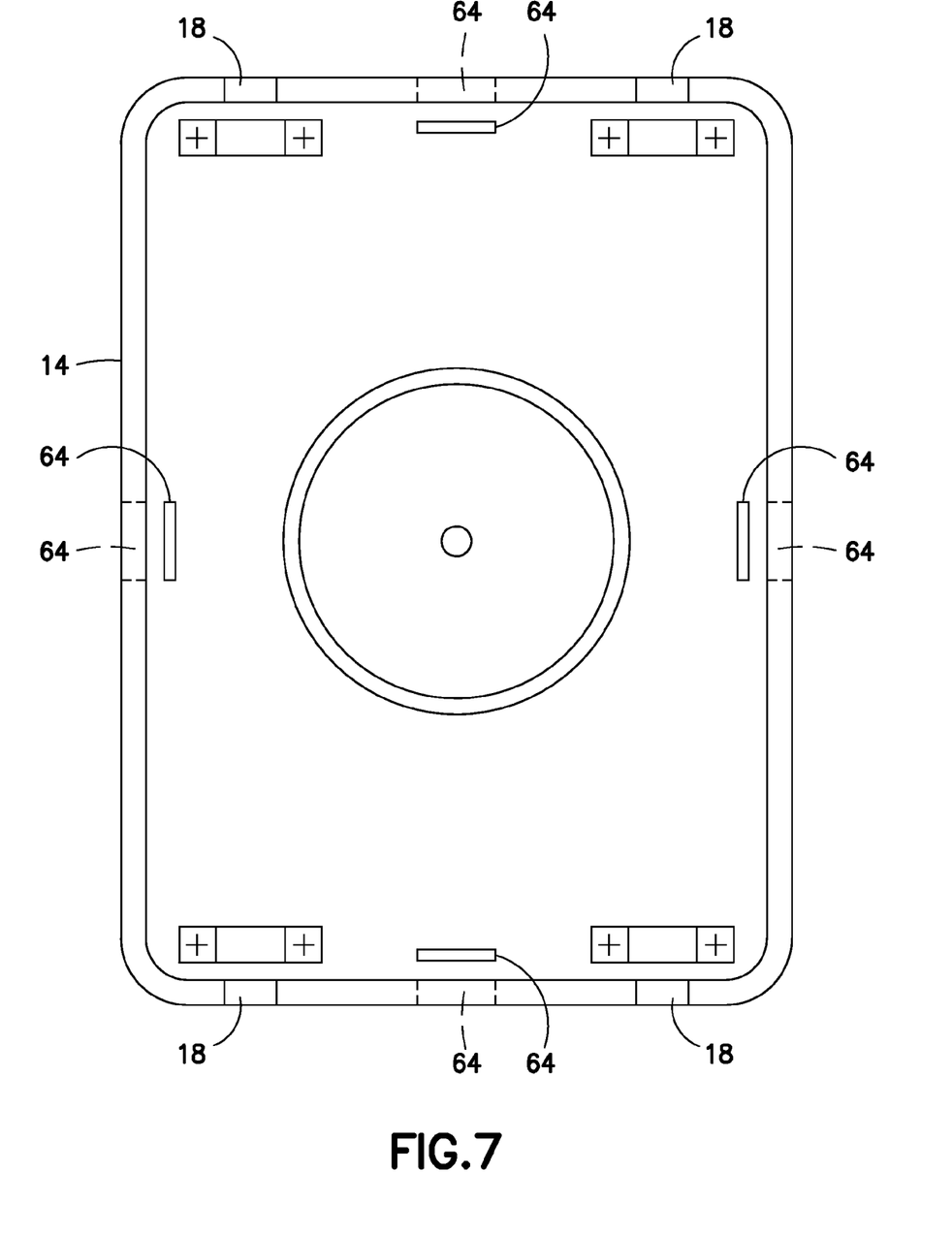
FIG. 7 is a rear (inside) view of the rear cover of the exerciser of the present invention.

The front cover 12 and a rear cover 14 have cooperating notches or apertures 16 and 18 respectively as illustrated in FIGS. 2 and 6-7 to allow the flexible band tubes 40 housing the resistance bands 30 to pass through when the front cover 12 is attached to the rear cover 14 and the body 10 of the exerciser is closed.

The mounting means for mounting the exerciser are preferably belts or straps 60, particularly nylon belts with plastic clasps 62 as illustrated in FIGS. 1-4 and 11-12. The belts of straps 60 are securely attached to the inside part of the rear cover 14, and they may be attached by folds, screws, or other methods known in the art. With reference to FIGS. 2 and 6, the belts of straps 60 protrude through openings 64 in the rear cover 14 so as to enable the user to attach the belts or straps 60 around the car seat or chair and to snap the clasps 62 to secure the exerciser. For that purpose, the clasps 62 include cooperating male and female clasps for attachment, and the belts or clasps 60 are preferably adjustable so as to be usable with any number of car seats or chars of varying sizes.

It should be noted that, although the preferred embodiment uses nylon belts 60 and plastic clasps 62, the belts may be made of fabric, leather, or a different suitable material, while the clasps 62 may be made of metal. The belts 60 typically pass through special openings 64 in the rear cover 14, as illustrated in FIG. 7. The front cover 12 may also have cooperating openings 66 shown in FIG. 5, to allow the belts 60 to pass through.

At least one substantially horizontal or substantially vertical belt 60 is used to mount the exerciser, but preferably the mounting includes at least one substantially vertical and at least one substantially horizontal belt 60 attached to the body 10 of the exerciser at approximately 90 degrees relative to each other, which securely mount the exerciser to the car seat. More than one horizontal or vertical belt 60 may be used to mount the exerciser yet even more securely, in any combination, such as two horizontal belts and one vertical belt, one horizontal and two vertical belts, and so on.

However, the exerciser may be mounted using other means known in the art, including rails, snaps, nuts and bolts, which would result in a more permanent or semi-permanent mounting, or even hook and loop attachment provided there is sufficient surface to ensure a secure attachment.

Figure 11:
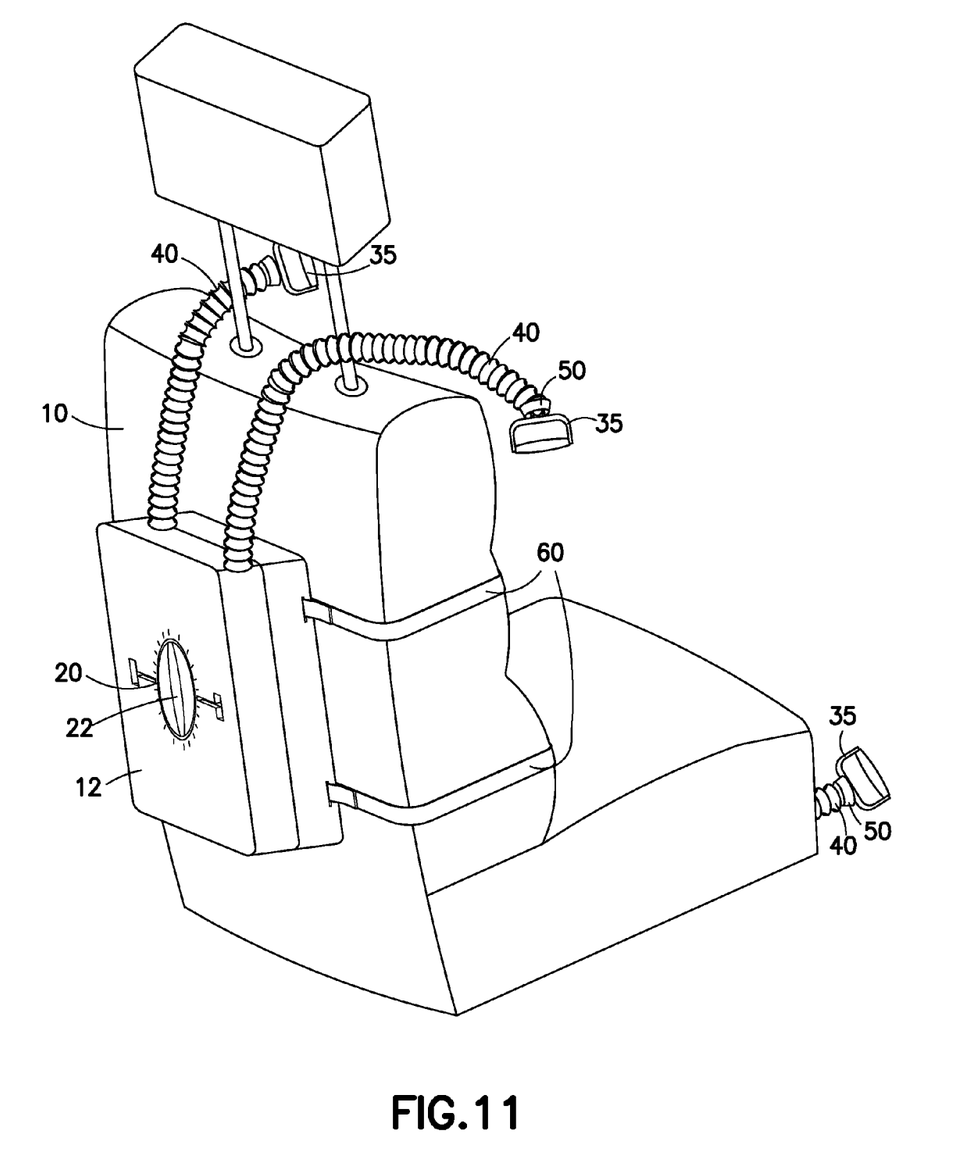
FIG. 11 is a perspective view of the exerciser of the present invention mounted to a car seat, using two horizontal belts.
Figure 12:
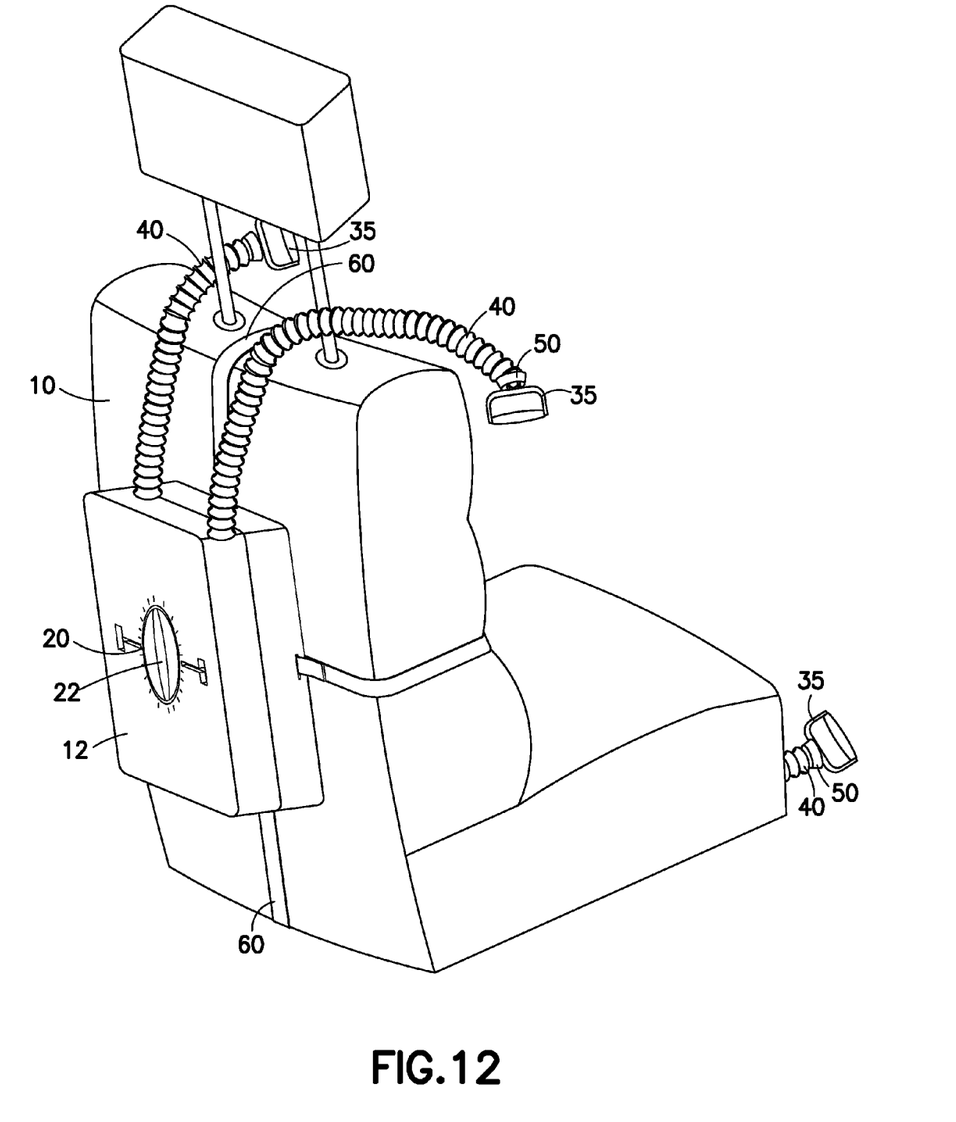
FIG. 12 is a perspective view of the exerciser of the present invention mounted to a car seat, using one vertical belt and one horizontal belt.

When the preferred embodiment of the exerciser of the present invention is in use, the user securely attaches the exerciser to the car seat using the horizontal and/or vertical belts 60 as illustrated in FIGS. 11-12. The two upper ends of the resistance bands 30 inside the flexible band tubes 40 housing them are positioned over the top end of the car seat, one on each side of the headrest, for use by the two arms of the user. The two lower ends of the resistance bands 30 are put through under the seat and positioned so that they may be used by the arms of the user for different kinds of exercises. The user then adjusts the tension of the resistance bands 30 to a desired level using the handle 22 of the tension adjuster 20, and the exerciser is ready to use. The user may grasp one or both upper handles 35 to exercise his or her arms and upper body, and the user may also use the lower handles 35 to exercise his or her arms in a different way, such as arm curls, shoulder raises, and other exercises. Of course, the user should not exercise while the car is moving.

When the exerciser is mounted in front of the car seat, it should be cushioned for comfort during driving and usage. The exerciser is portable and can be easily moved between vehicles.

The body of the exerciser, including the front and rear cover, can be made from many different materials, but the preferred embodiment uses plastics for their light weight, strength, durability, and low cost to produce. The locking latches may also be plastic.

The above description of the disclosed preferred embodiments is provided to enable any person skilled in the art to make or use the invention. Various modifications to these embodiments will be readily apparent to those skilled in the art, and the principles described herein can be applied to other embodiments without departing from the spirit or scope of the invention and the subject matter of the present invention, which is broadly contemplated by the Applicant. The scope of the present invention fully encompasses other embodiments that may be or become obvious to those skilled in the art.

The invention claimed is:

1. A portable exerciser for a vehicle, comprising:
   a. a body dimensioned to be insertable through a door of the vehicle, wherein the body is mountable to at least one car seat of the vehicle using mounting means, said at least one car seat having a backrest with a rear side and a front side;
   b. a tension adjuster disposed in the body and rotatably attached to the body, said tension adjuster having a handle accessible from outside of the body for rotating the tension adjuster;
   c. at least one tension lock disposed in the body, wherein the at least one tension lock is securely attached to the body, said at least one tension lock capable of engaging and disengaging the tension adjuster, preventing the tension adjuster from rotating when the at least one tension lock is engaged; and
   d. at least one elastic, flexible resistance element having a first end and a second end, wherein a handle is attached to the first end and the second end is operatively connected to the tension adjuster so as to enable the tension adjuster to selectively wind up or release a portion of the at least one flexible resistance element when the at least one tension lock is disengaged and the tension adjuster is rotated using the handle for rotating the tension adjuster.

2. The portable exerciser for a vehicle of claim 1, wherein a resistance of the at least one flexible resistance element is adjustable by disengaging the at least one tension lock, rotating the tension adjuster by the handle for rotating the tension adjuster so as to wind up or release a portion of the at least one flexible resistance element adjacent to the second end, and engaging the at least one tension lock.

3. The portable exerciser for a vehicle of claim 1, wherein there are two flexible resistance elements.

4. The portable exerciser for a vehicle of claim 1, further comprising at least one flexible replaceable resistance element, said at least one flexible replaceable resistance element having a different resistance than the at least one flexible resistance element and being selectable to replace the at least one flexible resistance element.

5. The portable exerciser for a vehicle of claim 1, wherein the mounting means are adjustable to fit car seats of varying sizes.

6. The portable exerciser for a vehicle of claim 1, wherein the mounting means for mounting the body to the at least one car seat are selected from the group consisting of belts, straps, hook and loop attachments, nuts and bolts, snaps and rails.

7. The portable exerciser for a vehicle of claim 1, wherein the mounting means include at least one substantially horizontal belt or strap.

8. The portable exerciser for a vehicle of claim 1, wherein the mounting means include at least one substantially vertical belt or strap.

9. The portable exerciser for a vehicle of claim 1, wherein the mounting means include at least one substantially vertical belt or strap and at least one substantially horizontal belt or strap.

10. The portable exerciser for a vehicle of claim 1, wherein the body is mounted to the at least one car seat behind the rear side of the backrest.

11. The portable exerciser for a vehicle of claim 1, wherein the body is mounted to the at least one car seat in front of the front side of the backrest.

12. The portable exerciser for a vehicle of claim 11, wherein the body is cushioned to provide additional cushioning for a user.

13. The portable exerciser for a vehicle of claim 1, further comprising at least one flexible tube enclosing each the at least one flexible resistance element.

14. The portable exerciser for a vehicle of claim 13, further comprising tube bushings coupled to each end of the at least one flexible band tube, so as to protect the at least one flexible resistance element from wearing out.

15. The portable exerciser for a vehicle of claim 1, wherein the body includes an aperture for each the at least one flexible resistance element, through which each the at least one flexible resistance element passes.

16. The portable exerciser for a vehicle of claim 1, wherein the at least one tension lock is selected from the group consisting of slide locks, spring-loaded locks and latches.

17. A portable exerciser for a vehicle, comprising:
   a. a body dimensioned to be insertable through a door of the vehicle, said body having a front cover with a front inner side and a front outer side and a rear cover with a rear inner side and a rear outer side, said body being mountable to at least one car seat of the vehicle using mounting means, said at least one car seat having a backrest with a rear side and a front side, wherein the body is mounted to the at least one car seat so that the rear outer side of the rear cover and the rear side or the front side of the backrest are in contact;
   b. a tension adjuster disposed in the body and rotatably attached to the rear inner side of the rear cover, said tension adjuster having a handle for rotating the tension adjuster, said handle for rotating the tension adjuster being accessible through a cooperating opening in the front cover;
   c. at least one tension lock disposed in the body and securely attached to the front inner side of the front cover, said at least one tension lock capable of engaging and disengaging the tension adjuster, preventing the tension adjuster from rotating when the at least one tension lock is engaged; and
   d. at least one elastic, flexible resistance element having a first end and a second end, wherein a handle is attached to the first end and the second end is operatively connected to the tension adjuster so as to enable the tension adjuster to selectively wind up or release a portion of the at least one flexible resistance element when the at least one tension lock is disengaged and the tension adjuster is rotated using the handle for rotating the tension adjuster.

18. The portable exerciser for a vehicle of claim 17, further comprising at least one flexible tube enclosing each the at least one flexible resistance element.

19. The portable exerciser for a vehicle of claim 18, further comprising tube bushings coupled to each end of the at least one flexible tube, so as to protect the at least one flexible resistance element from wearing out.

20. The portable exerciser for a vehicle of claim 18, wherein the body includes an aperture for each the at least one flexible tube, through which each the at least one flexible tube enclosing each the at least one flexible resistance element passes.

* * * * *